(12) United States Patent
Lin

(10) Patent No.: US 11,167,976 B2
(45) Date of Patent: Nov. 9, 2021

(54) COLD BREW COFFEE EXTRACTION DEVICE

(71) Applicant: Uni-Splender Corporation, Tainan (TW)

(72) Inventor: Yu-Yuan Lin, Tainan (TW)

(73) Assignee: Uni-Splender Corporation, Tainan (TW)

( * ) Notice: Subject to any disclaimer, the term of this patent is extended or adjusted under 35 U.S.C. 154(b) by 512 days.

(21) Appl. No.: 16/251,205

(22) Filed: Jan. 18, 2019

(65) Prior Publication Data

US 2020/0231424 A1 Jul. 23, 2020

(51) Int. Cl.
*A47J 31/41* (2006.01)
*B67D 1/08* (2006.01)
*A47J 31/16* (2006.01)
*A47J 31/00* (2006.01)

(52) U.S. Cl.
CPC .......... *B67D 1/0857* (2013.01); *A47J 31/002* (2013.01); *A47J 31/16* (2013.01); *A47J 31/41* (2013.01)

(58) Field of Classification Search
CPC .......... A47J 31/002; A47J 31/16; A47J 31/41; A47J 31/42; A47J 31/46; A47J 31/407; A47J 31/36; A47J 1/465; A47J 31/469; A47J 31/56; A47J 31/57; A47J 31/58; A47J 31/057; A47J 31/0652; B67D 1/0857
USPC ......... 99/279, 281, 282, 284, 286, 288, 290, 99/293, 295, 300, 304, 306
See application file for complete search history.

*Primary Examiner* — Phuong T Nguyen
(74) *Attorney, Agent, or Firm* — Alan D. Kamrath; Karin L. Williams; Mayer & Williams PC

(57) ABSTRACT

A cold brew coffee extraction device includes a container having a first chamber for receiving cold water. A filtering cup is mounted in the first chamber and includes a second chamber intercommunicating with the first chamber. The second chamber receives coffee powders and includes a second opening. The filtering cup further includes a third opening at a lower end thereof and receiving a filter. A first guiding tube includes a first end intercommunicating with the second chamber and a second end located outside of the container. A pump is disposed outside of the container and is connected to the second end of the first guiding tube. A controller is electrically connected to the pump to control operation of the pump to thereby supply air into or suck air out of the first guiding tube, thereby controlling a water level of the cold water in the first chamber.

9 Claims, 16 Drawing Sheets

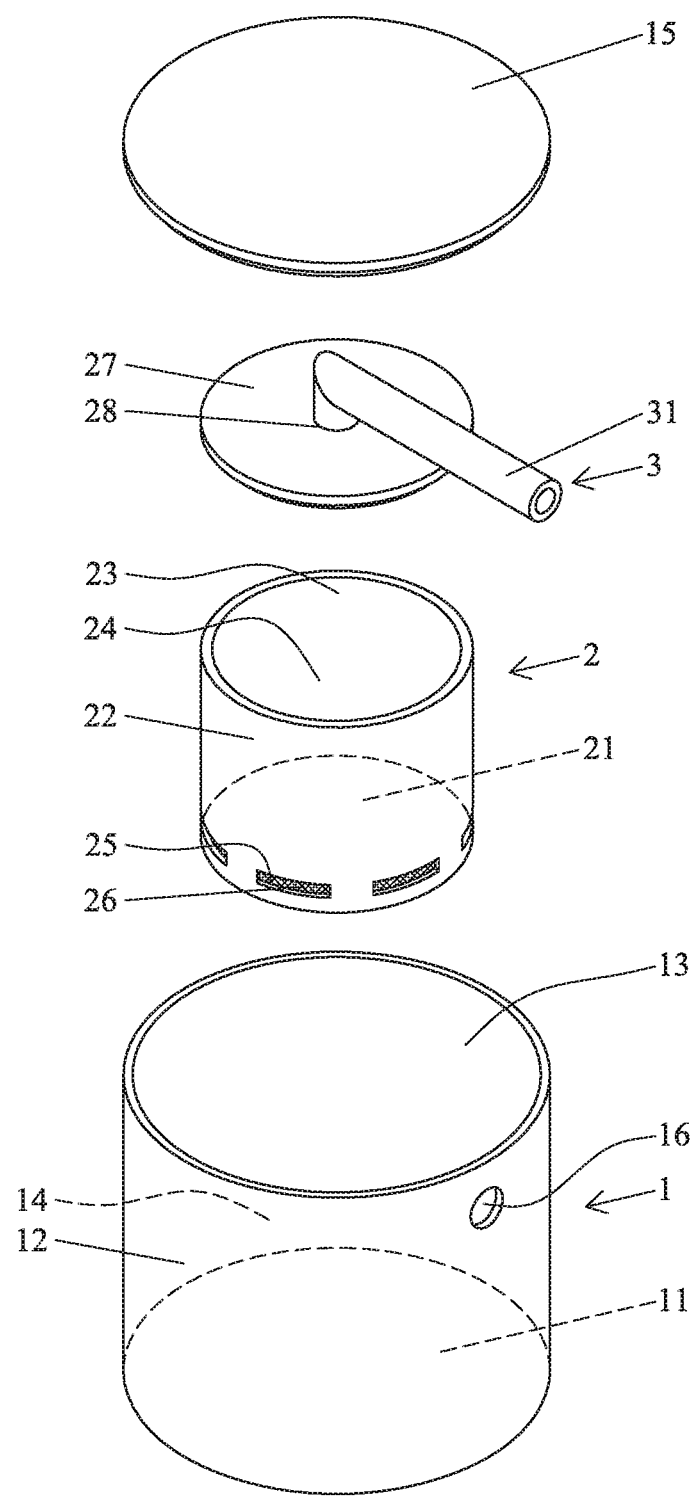
F I G . 1

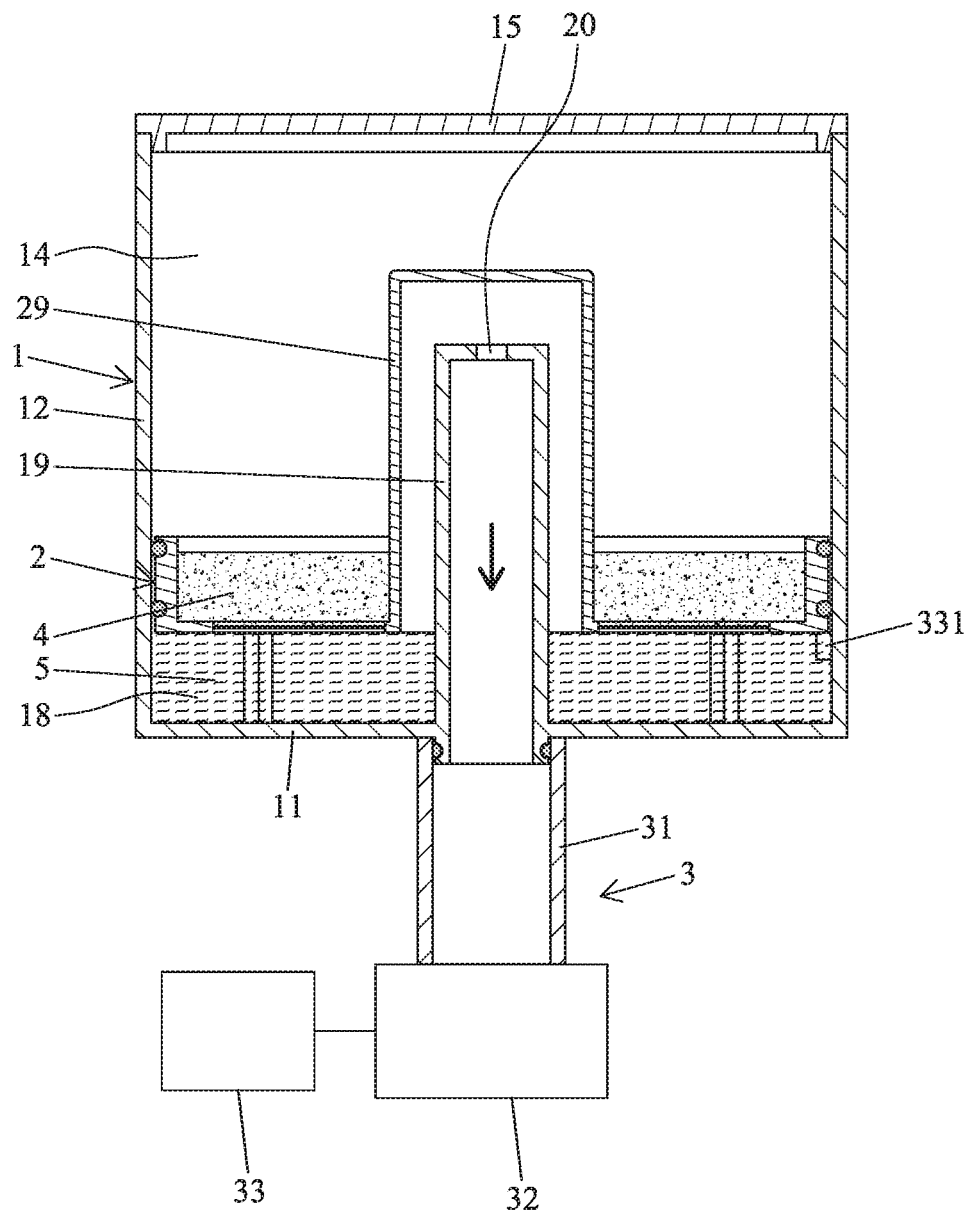
F I G . 16

COLD BREW COFFEE EXTRACTION DEVICE

BACKGROUND OF THE INVENTION

The present invention relates to a cold brew coffee extraction device and, more particularly, to a cold brew coffee extraction device providing enhanced extraction efficiency of cold coffee.

A conventional method of brewing coffee includes grinding coffee beans into powders and pouring hot water over ground coffee powders to extract coffee with an aroma. Although hot water can rapidly extract the coffee flavor, the bitter ingredients in the coffee are apt to be extracted at high temperature at the same time, leading to a bitter taste. Furthermore, ice cubes must be added for making cold coffee and, thus, adversely affect the taste of coffee due to dilution.

To solve the above problems, a method of extracting coffee at low temperature to provide a different taste from coffee obtained from high-temperature extraction has been provided. The low-temperature extraction method includes placing ground coffee powders in a filtering paper or a strainer and filling cold water to immerse the ground coffee powders. The cold water can slowly extract the coffee, and liquid coffee with a low-temperature flavor is obtained after about 10-24 hours.

However, the above low-temperature extraction method requires long-term immersion, which is not efficient, and a person has to wait for a long period of time. If the immersion time is reduced, the concentration and the taste of coffee are adversely affected.

BRIEF SUMMARY OF THE INVENTION

An objective of the present invention is to provide a cold brew coffee extraction device that has a light weight and that provides enhanced extraction efficiency of cold coffee.

A cold brew coffee extraction device according the present invention includes a container having a first chamber configured to receive cold water. The first chamber includes a first opening. A first cover is provided to seal the first opening. A filtering cup is mounted in the first chamber. The filtering cup includes a second chamber intercommunicating with the first chamber. The second chamber is configured to receive coffee powders. The second chamber includes a second opening. The filtering cup further includes a third opening at a lower end thereof. A filter is disposed in the third opening. An extraction operation device includes a first guiding tube, a pump, and a controller. The first guiding tube includes a first end intercommunicating with the second chamber and a second end located outside of the container. The pump is disposed outside of the container and is connected to the second end of the first guiding tube. The controller is electrically connected to the pump to control operation of the pump to thereby supply air into or suck air out of the first guiding tube, thereby controlling a water level of the cold water in the first chamber.

In an example, the container includes a first bottom wall and a first annular wall extending upward from the first bottom wall. The first opening is located in an upper end of the first annular wall. The first bottom wall and the first annular wall define the first chamber.

In an example, a second cover is provided to seal the second opening. The first guiding tube extends through the container and the second cover. The filtering cup includes a second bottom wall and a second annular wall extending upward from the second bottom wall. The second opening is located in an upper end of the second annular wall. The second bottom wall and the second annular wall define the second chamber. The third opening is located in a lower portion of the second annular wall.

In an example, the controller includes a water level detection device. The water level detection device detects the water level of the cold water in the first chamber and controls the pump to supply air into or suck air out of the first guiding tube.

In another example, the extraction operation device further includes a second guiding tube extending through the container. The second guiding tube includes a first end located in an upper portion of the first chamber and a second end connected to the pump. The second pump is configured to supply air into the first and second guiding tubes or to suck air out of the first and second guiding tubes.

In an example, the filtering cup includes a second bottom wall and a second annular wall extending upward from the second bottom wall. The second annular wall sealingly abuts the first annular wall of the container. A compartment is provided between the first bottom wall and the second bottom wall. A sleeve extends upward from the second bottom wall and includes a lower end intercommunicating with the compartment and an upper end connected to the first end of the first guiding tube.

In another example, the filtering cup includes a second bottom wall and a second annular wall extending upward from the second bottom wall. The second annular wall sealingly abuts the first annular wall of the container. A compartment is provided between the first bottom wall and the second bottom wall. A sleeve extends upward from the second bottom wall and includes a lower end intercommunicating with the compartment. An inner tube extends upward from the first bottom wall and includes an upper end received in the sleeve and a lower end connected to the first guiding tube. A through-hole is provided in the upper end of the inner tube to intercommunicate the inner tube with the compartment.

In the example including the first and second guiding tubes, the pump can operate to independently supply air into or out of the first guiding tube or the second guiding tube, significantly improving the extraction efficiency of cold coffee.

The present invention will become clearer in light of the following detailed description of illustrative embodiments of this invention described in connection with the drawings.

DESCRIPTION OF THE DRAWINGS

FIG. 1 is an exploded, perspective view of a cold brew coffee extraction device of a first embodiment according to the present invention.

FIGS. 15 and 16 are cross sectional views illustrating an extraction operation of a cold brew coffee extraction device of a fourth embodiment according to the present invention.

DETAILED DESCRIPTION OF THE INVENTION

Figure 2:
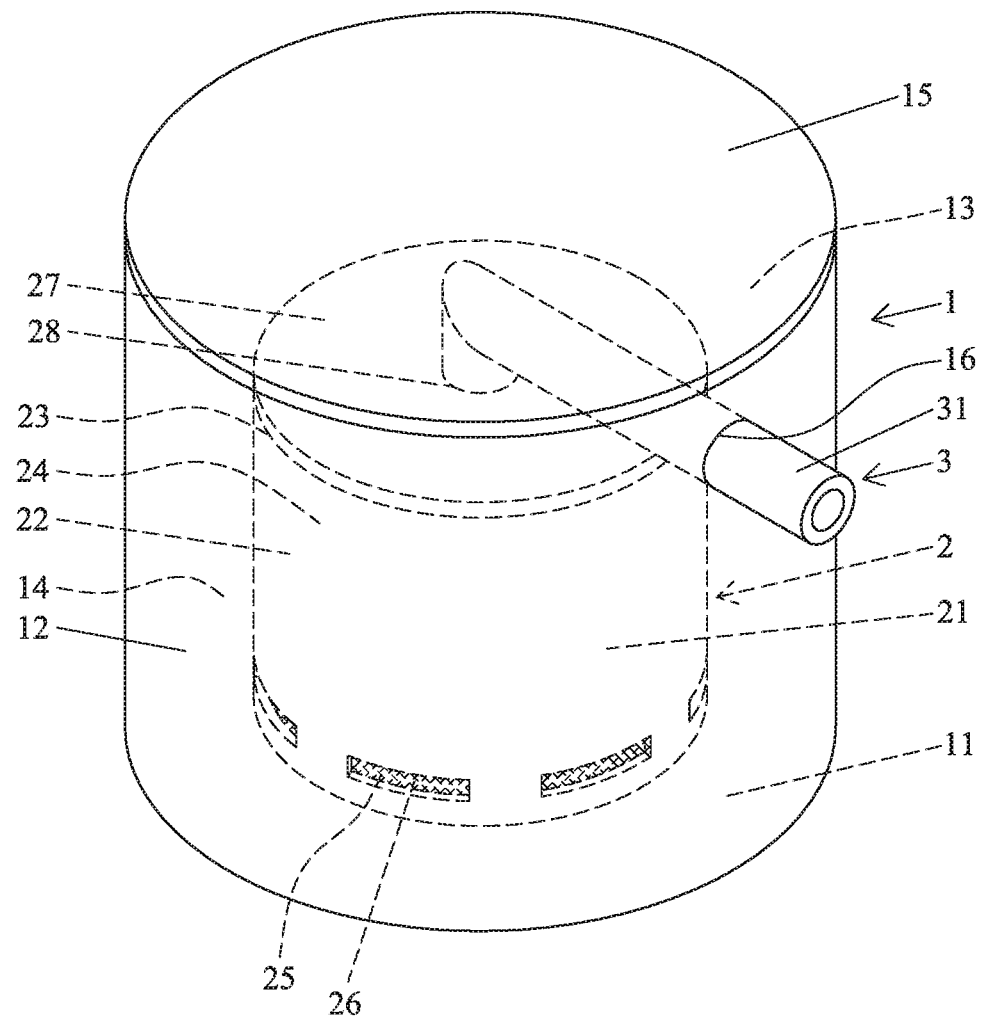
FIG. 2 is a perspective view of the cold brew coffee extraction device of FIG. 1.
Figure 3:
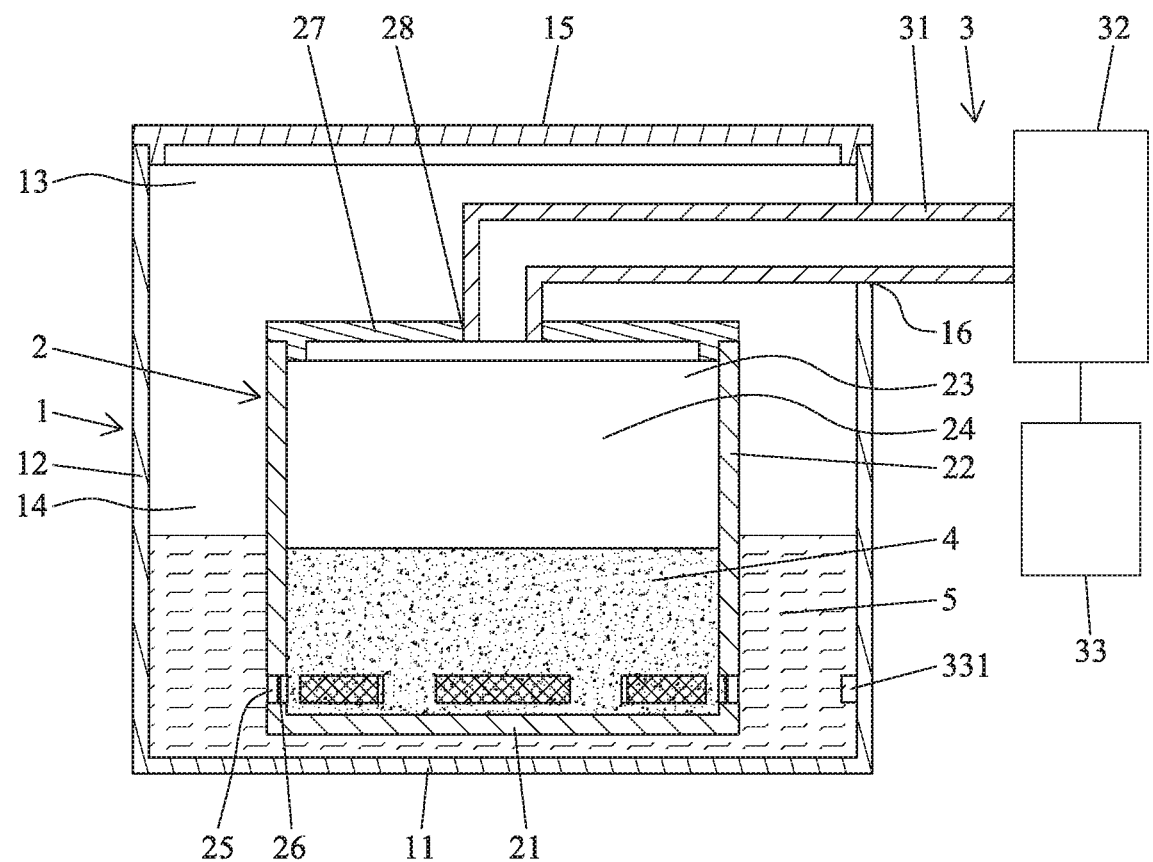
FIG. 3 is a cross sectional view of the cold brew coffee extraction device of FIG. 2, with cold water and coffee powders placed into the cold brew coffee extraction device.

Where used in the various figures of the drawings, the same numerals designate the same or similar parts. With reference to FIGS. 1-3, a cold brew coffee extraction device of a first embodiment according to the present invention includes a container 1, a filtering cup 2, and an extraction operation device 3. The container 1 includes a first bottom wall 11 and a first annular wall 12 extending upward from the first bottom wall 11. A first opening 13 is provided in an upper end of the first annular wall 12. The first bottom wall 11 and the first annular wall 12 define a first chamber 14. A first cover 15 is mounted to the upper end of the first chamber 14 to seal the first opening 13. The first annular wall 12 includes a first through-hole 16 intercommunicating with the first chamber 14.

The filtering cup 2 has a volume smaller than the container 1 and is mounted in the first chamber 14. The filtering cup 2 includes a second bottom wall 21 and a second annular wall 22 extending upward from the second bottom wall 21. A second opening 23 is provided in an upper end of the second annular wall 22. The second bottom wall 21 and the second annular wall 22 define a second chamber 24 intercommunicating with the first chamber 14. A third opening 25 is provided in a lower portion of the second annular wall 22. A filter 26, such as a filter screen, is disposed in the third opening 25. In an alternative embodiment, the third opening 25 can be provided in the bottom of the filtering cup 2, and a filter can be disposed in the third opening 25. Furthermore, a second cover 27 is mounted to the upper end of the second annular wall 22 to seal the second opening 23 and includes a third through-hole 28.

The extraction operation device 3 includes a first guiding tube 31, a pump 32, and a controller 33. The first guiding tube 31 extends through the first through-hole 16 and includes a first end connected to the second cover 27 to intercommunicate with the second chamber 24 and a second end located outside of the container 1. An outer periphery of the first guiding tube 31 is in sealing contact with an inner periphery of the first through-hole 16. Thus, the first chamber 14 can be sealed. The pump 32 is disposed outside of the container 1 and is connected to the second end of the first guiding tube 31. The controller 33 is electrically connected to the pump 32 and includes a water level detection device 331 for controlling operation of the pump 32 to thereby supply air into or suck air out of the first guiding tube 31, thereby controlling a water level of a liquid in the first chamber 14. The water level detection device 331 can be a probe, a magnetic reed switch, or other water level detection device.

Figure 4:
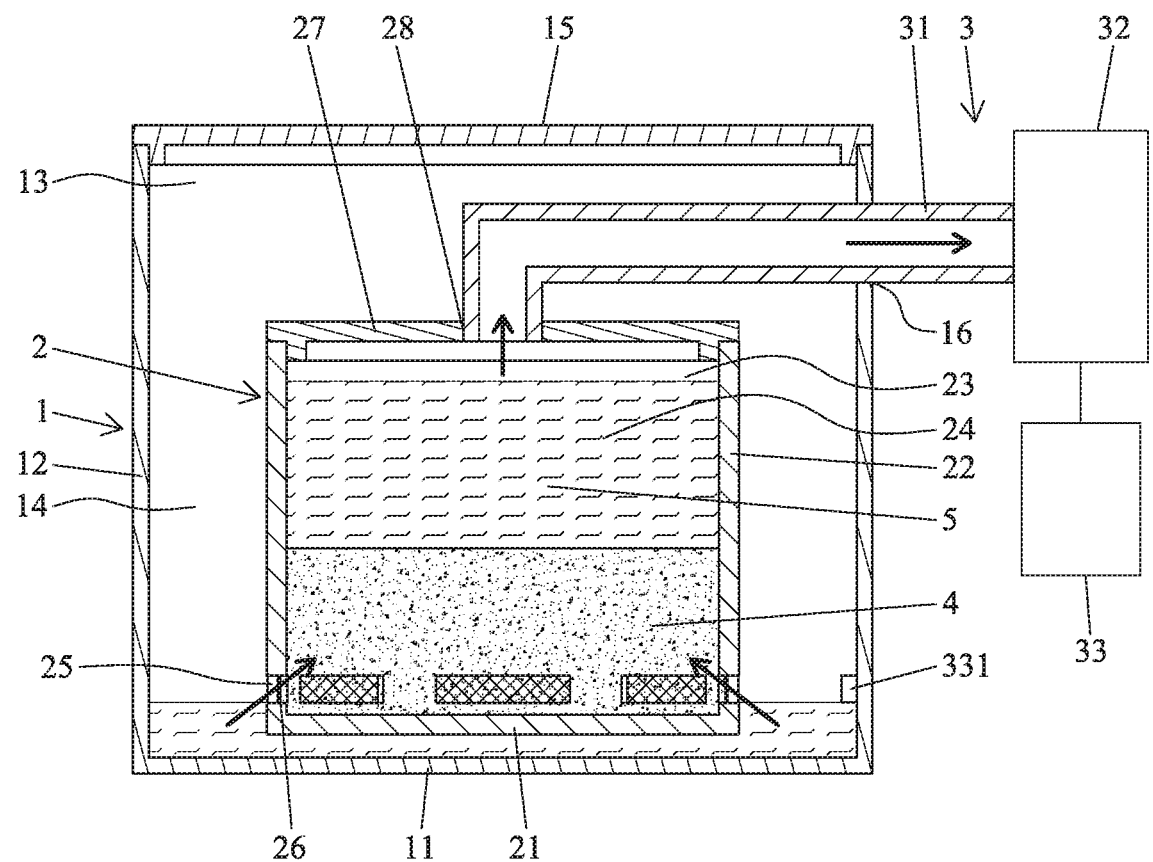
FIGS. 4 and 5 are cross sectional views similar to FIG. 3, illustrating an extraction operation of the cold brew coffee extraction device.
Figure 5:
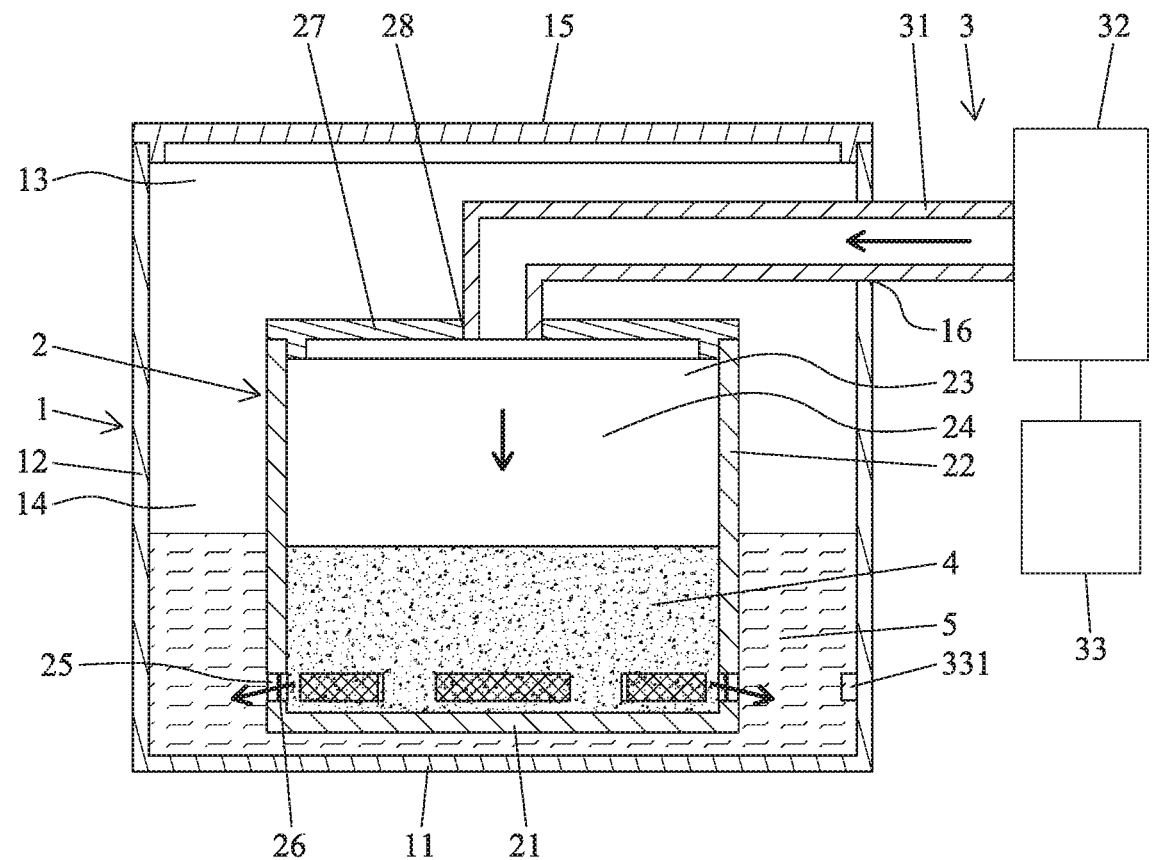

In operation, with reference to FIG. 3, coffee powders 4 are placed into the second chamber 24 of the filtering cup 2, and cold water 5 is filled into the first chamber 14. The first cover 15 and the second cover 27 seal the first chamber 14 and the second chamber 24, respectively. With reference to FIG. 4, the pump 32 is activated to suck air, the cold water 5 in the first chamber 14 flows through the filter 26 into the second chamber 24 to immerse the coffee powders 4. With reference to FIG. 5, the pump 32 supplies air into the second chamber 24 to make the cold water 5 (after immersion) flow through the filter 26 into the first chamber 14. The water level detection device 331 detects the water level and stops the pump 32 when the water level reaches a predetermined threshold. Furthermore, the cold water 5 is prevented from flowing into the first guiding tube 31. Thus, the cold water 5 can be controlled to flow into the second chamber 24 for immersion and then flows back into the first chamber 14. The coffee can be efficiently extracted in a short period of time after repeated immersion and impact by the cold water 5. After brewing, the liquid coffee is poured out of the container 1 or drips outward from the bottom of the first chamber 14 for drinking purposes.

Figure 6:
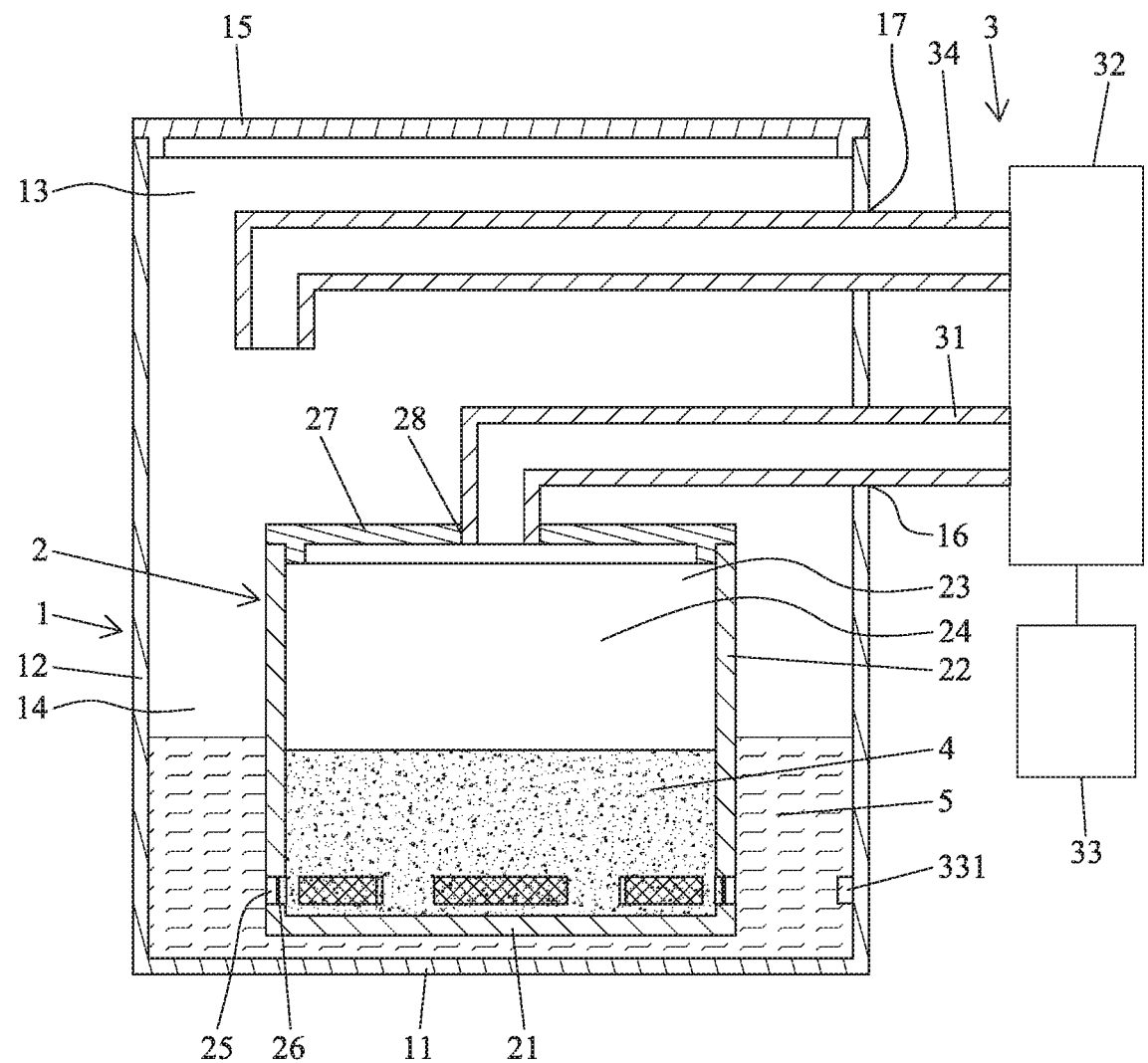
FIG. 6 is a cross sectional view of a cold brew coffee extraction device of a second embodiment according to the present invention, with cold water and coffee powders placed into the cold brew coffee extraction device.

FIG. 6 shows a cold brew coffee extraction device of a second embodiment according to the present invention. In this embodiment, the first annular wall 12 of the container 1 includes a first through-hole 16 and a second through-hole 17. The extraction operation device 3 includes a first guiding tube 31 and a second guiding tube 34. The first guiding tube 31 extends through the first through-hole 16 and includes a first end connected to the third-through hole 28 of the filtering cup 2 and a second end connected to the pump 32. The second guiding tube 34 extends through the second through-hole 17 and includes a first end intercommunicating with an upper portion of the first chamber 14 and a second end connected to the pump 32. Thus, the pump 32 can operate to supply air into or suck air out of the first guiding tube 31 or the second guiding tube 34.

Figure 7:
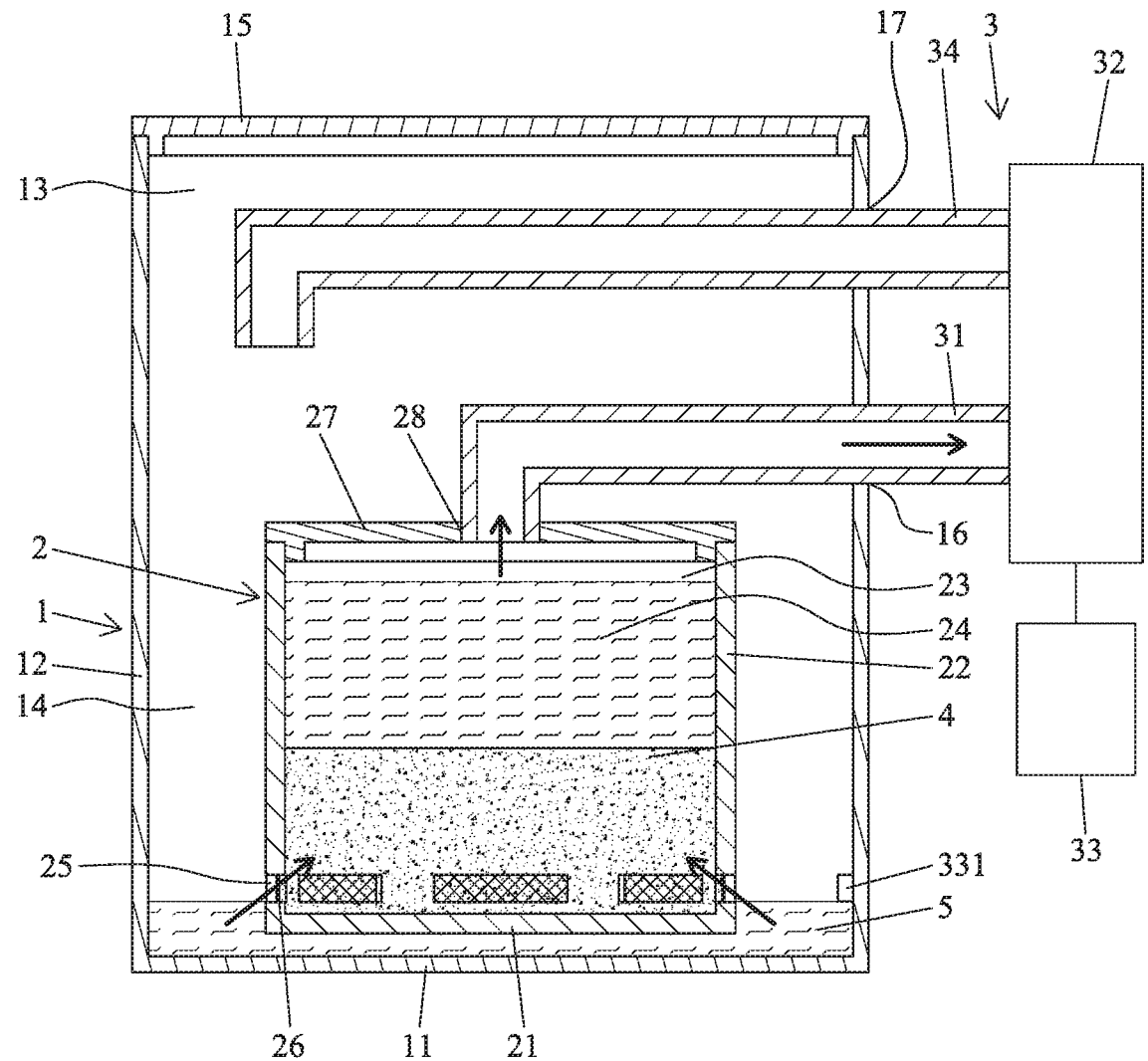
FIGS. 7 and 8 are cross sectional views similar to FIG. 6, illustrating an extraction operation of the cold brew coffee extraction device.
Figure 8:
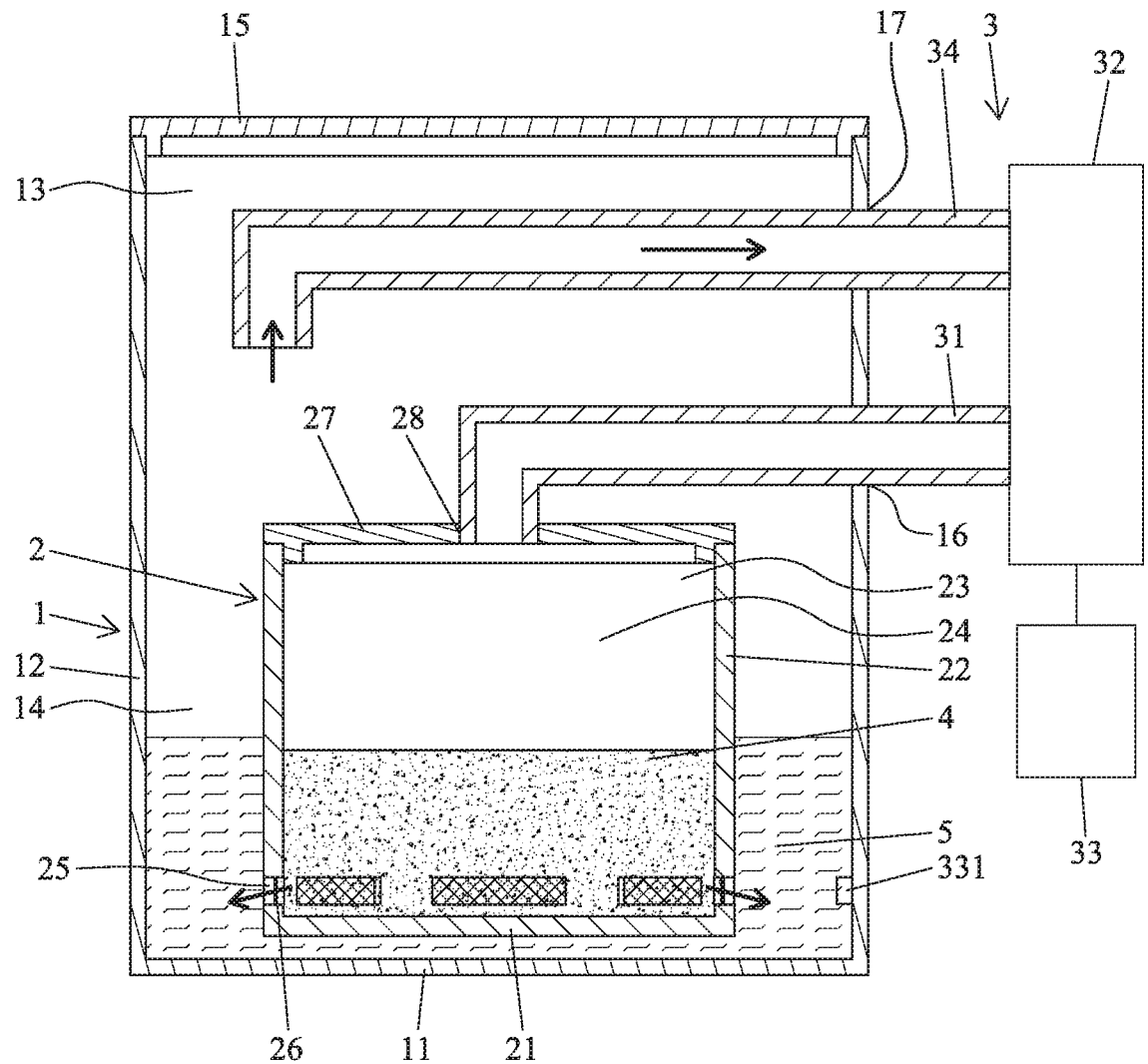

In operation, with reference to FIG. 7, the pump 32 can be activated to suck air out of the second chamber 24 via the first guiding tube 31 without operation of the second guiding tube 34, and the cold water 5 in the first chamber 14 flows into the second chamber 24 to immerse the coffee powders 4. With reference to FIG. 8, the pump 32 can suck air out of the first chamber 14 via the second guiding tube 34 without operation of the first guiding tube 31, and the cold water 5 in the second chamber 24 flows back into the first chamber 14. The procedures can be repeated to rapidly extract the coffee flavor.

Figure 9:
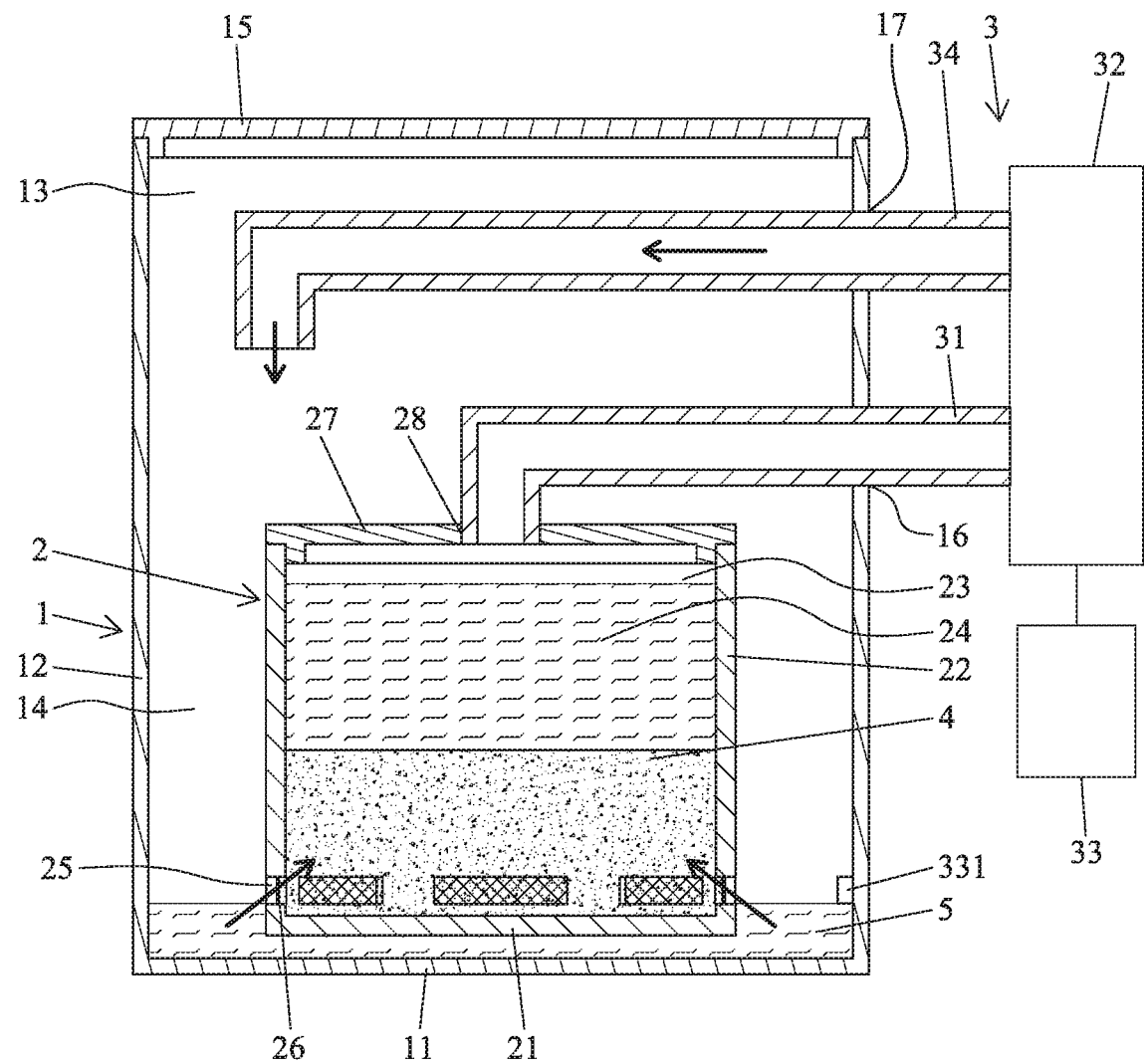
FIGS. 9 and 10 are cross sectional views similar to FIG. 6, illustrating another extraction operation of the cold brew coffee extraction device.
Figure 10:
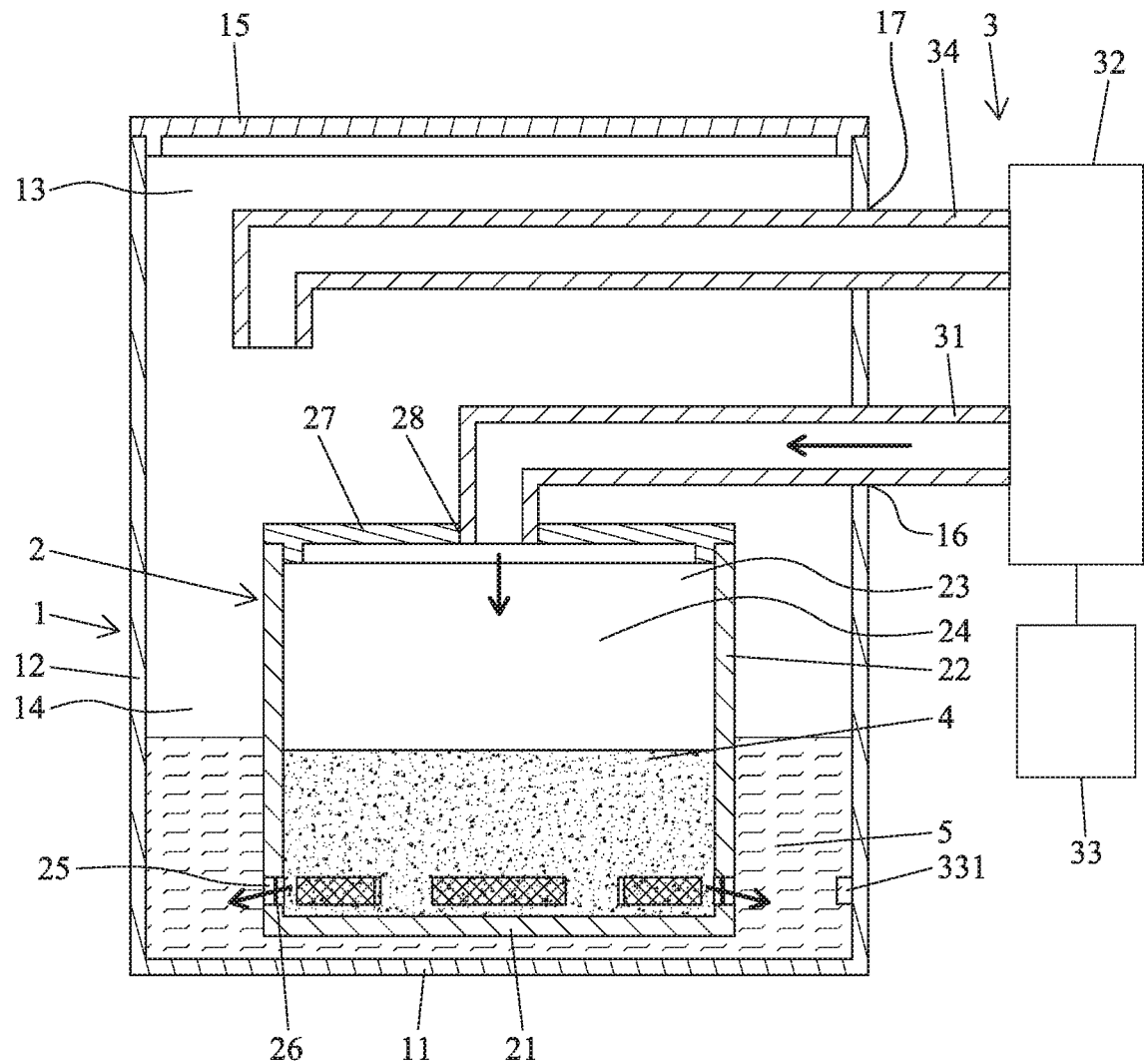
Figure 11:
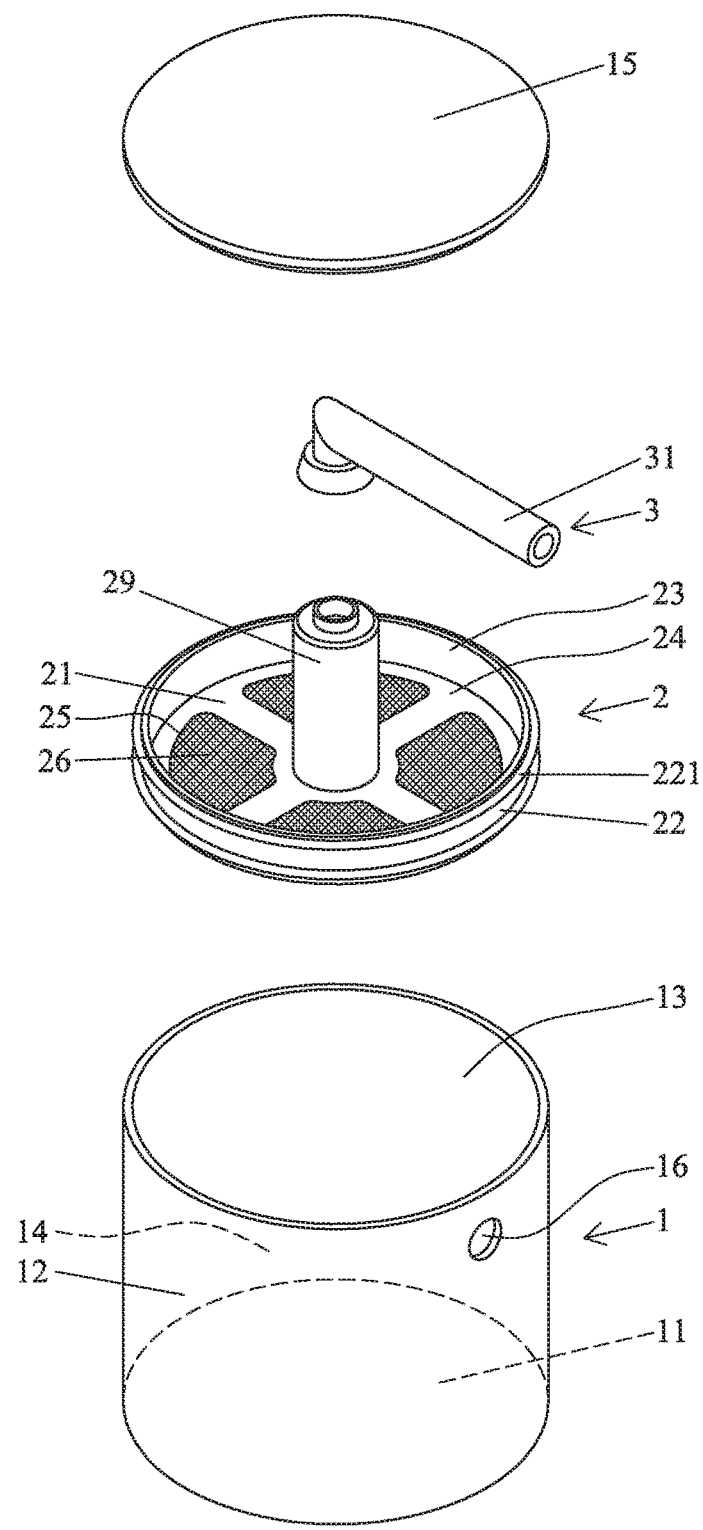
FIG. 11 is an exploded, perspective view of a cold brew coffee extraction device of a third embodiment according to the present invention.

With reference to FIG. 9, alternatively, the pump 32 can be activated to make the second guiding tube 34 suck air without operation of the first guiding tube 31, and the cold water 5 in the first chamber 14 flows into the second chamber 24 to immerse the coffee powders 4. With reference to FIG. 10, the pump 32 can make the first guiding tube 32 suck air without operation of the second guiding tube 34, and the cold water 5 in the second chamber 24 flows into the first chamber 14. The procedures can be repeated to rapidly extract the coffee flavor.

FIG. 11-14 show a cold brew coffee extraction device of a third embodiment according to the present invention similar to the first embodiment. In this embodiment, the filtering cup 2 does not include the second cover 27, and the second annular wall 22 sealingly abuts the first annular wall 12 of the container 1 by a washer 221 between the first and second annular walls 12 and 22. Furthermore, the first chamber 14 includes a compartment 18 between the first bottom wall 11 and the second bottom wall 21. A sleeve 29 extends upward from the second bottom wall 21 and includes a lower end intercommunicating with the compartment 18 and an upper end connected to the first end of the first guiding tube 31.

Figure 12:
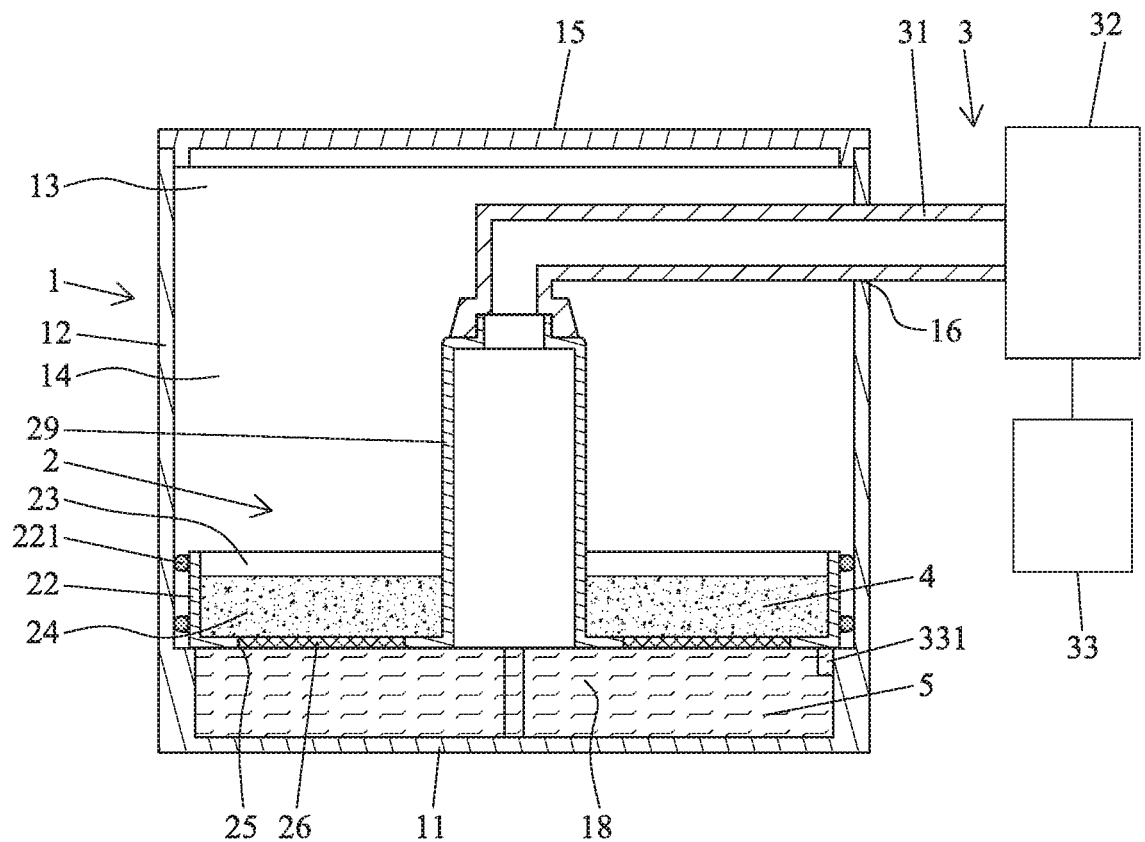
FIG. 12 is a cross sectional view of the cold brew coffee extraction device of FIG. 11, with cold water and coffee powders placed into the cold brew coffee extraction device.
Figure 13:
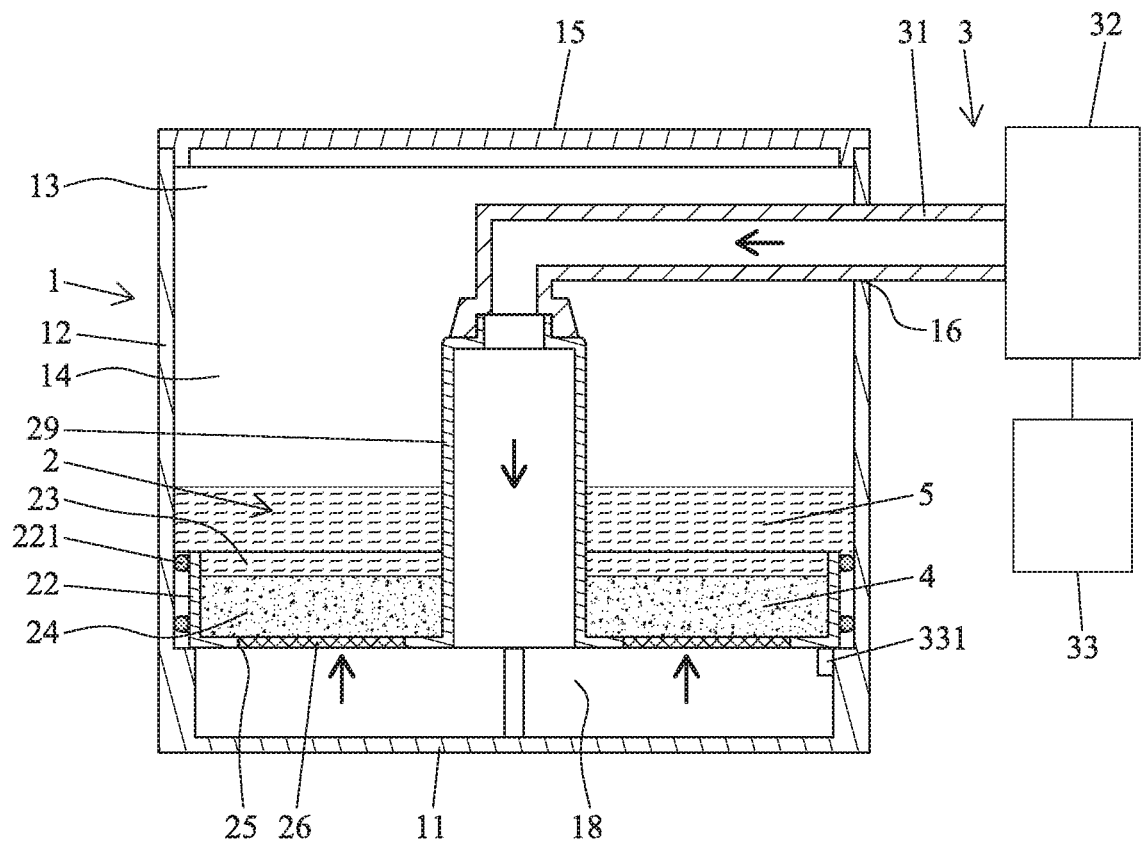
FIGS. 13 and 14 are cross sectional views similar to FIG. 12, illustrating an extraction operation of the cold brew coffee extraction device.
Figure 14:
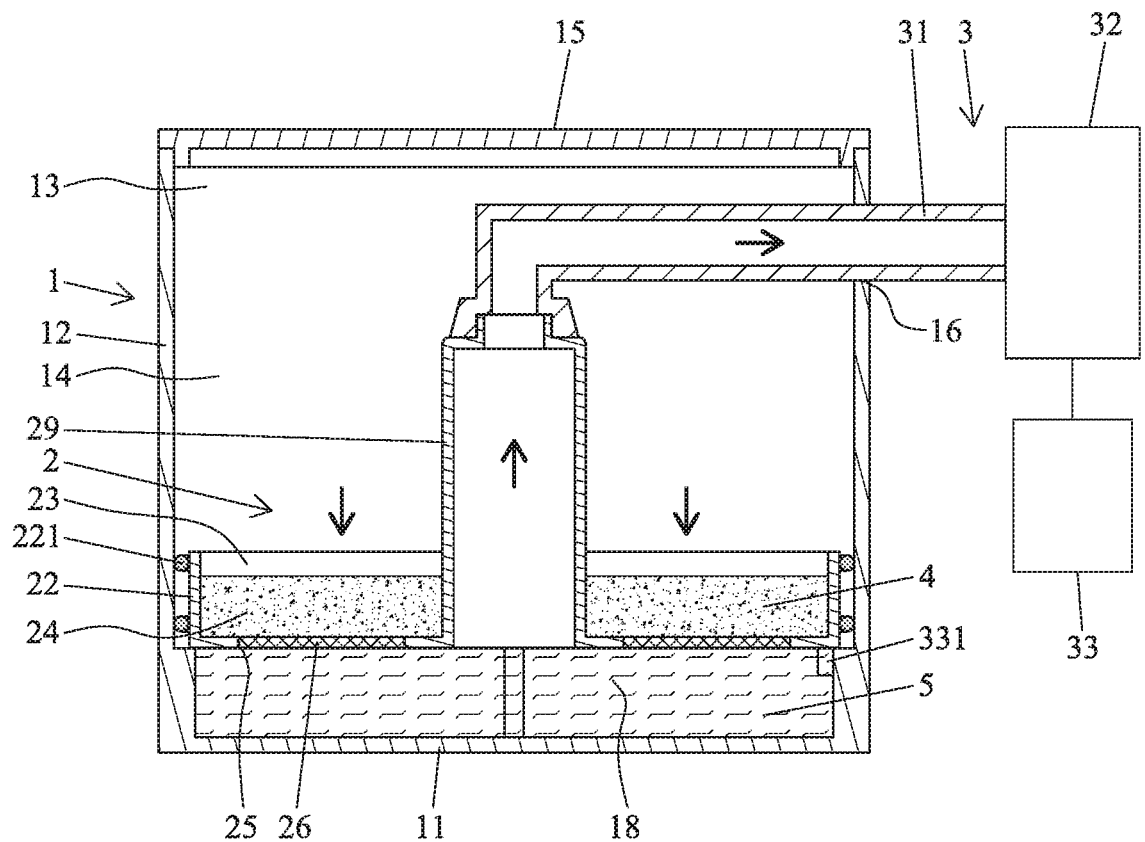

As shown in FIG. 12, in operation, coffee powders 4 are placed into the second chamber 24 of the filtering cup 2, and cold water 5 is filled into the compartment 18 of the first chamber 14. With reference to FIG. 13, the pump 32 is activated to supply air into the sleeve 29 via the first guiding tube 31, moving the cold water 5 in the compartment 18 of the first chamber 14 through the filter 26 into an upper portion of the second chamber 24 while impacting the coffee powders 4. With reference to FIG. 14, the pump 32 can suck air out of the sleeve 29 via the second guiding tube 32, and the cold water 5 flows back into the compartment 18. The procedures can be repeated to rapidly extract the coffee flavor. This embodiment does not have to include the second cover 27 at the upper end of the second chamber 24 to permit easy installation as well as easy pouring of the coffee powders 4. This embodiment can also include the water level detection device 331 to detect the water level for controlling operation of the pump 32, providing better operational stability.

Figure 15:
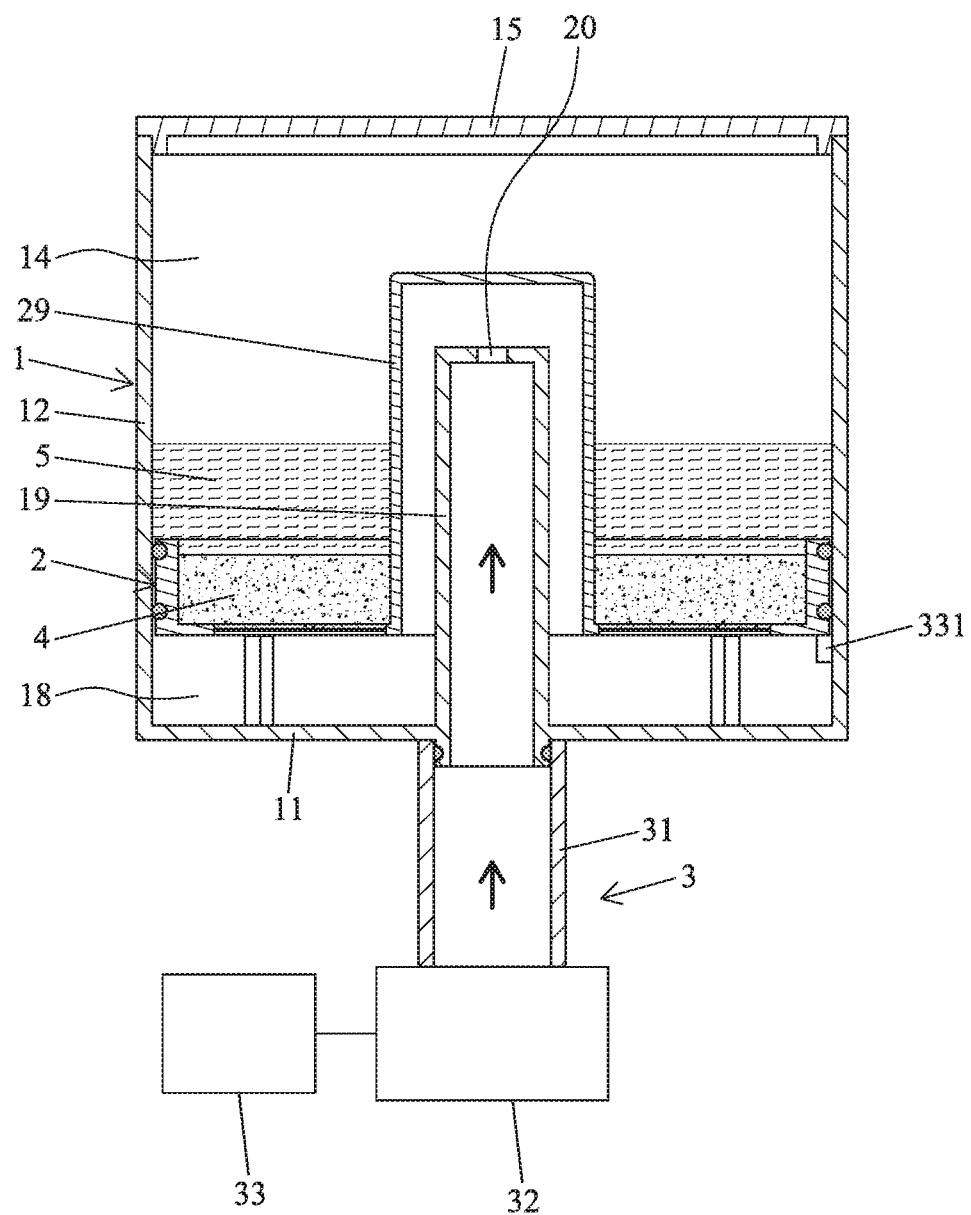

FIGS. 15 and 16 show a cold brew coffee extraction device of a fourth embodiment according to the present invention similar to the third embodiment. In this embodiment, an inner tube 19 extends upward from the first bottom wall 11 and includes an upper end received in the sleeve 29 and a lower end connected to the first guiding tube 31. A through-hole 20 is provided in the upper end of the inner tube 19 to intercommunicate the inner tube 19 with the compartment 18. The pump 32 can be activated to supply air (FIG. 15) and suck air (FIG. 16) to extract the coffee flavor. This embodiment can also include the water level detection device 331 to detect the water level for controlling operation of the pump 32, providing better operational stability.

In view of the foregoing, the cold brew coffee extraction device according to the present invention has a light weight and repeatedly impacts and immerses the coffee powders 4 to significantly improve the extraction efficiency and the flavor of coffee.

Although specific embodiments have been illustrated and described, numerous modifications and variations are still possible without departing from the scope of the invention. The scope of the invention is limited by the accompanying claims.

The invention claimed is:

1. A cold brew coffee extraction device comprising:
   a container including a first chamber configured to receive cold water, wherein the first chamber includes a first opening, and wherein a first cover is provided to seal the first opening;
   a filtering cup mounted in the first chamber, wherein the filtering cup includes a second chamber intercommunicating with the first chamber, wherein the second chamber is configured to receive coffee powders, wherein the second chamber includes a second opening, wherein the filtering cup further includes a third opening at a lower end thereof, and wherein a filter is disposed in the third opening; and
   an extraction operation device including a first guiding tube, a pump, and a controller, wherein the first guiding tube includes a first end intercommunicating with the second chamber and a second end located outside of the container, wherein the pump is disposed outside of the container and is connected to the second end of the first guiding tube, and wherein the controller is electrically connected to the pump to control operation of the pump to thereby supply air into or suck air out of the first guiding tube, thereby controlling a water level of the cold water in the first chamber.

2. The cold brew coffee extraction device as claimed in claim 1, wherein the container includes a first bottom wall and a first annular wall extending upward from the first bottom wall, wherein the first opening is located in an upper end of the first annular wall, and wherein the first bottom wall and the first annular wall define the first chamber.

3. The cold brew coffee extraction device as claimed in claim 2, wherein the filtering cup includes a second bottom wall and a second annular wall extending upward from the second bottom wall, wherein the second annular wall sealingly abuts the first annular wall of the container, wherein a compartment is provided between the first bottom wall and the second bottom wall, wherein a sleeve extends upward from the second bottom wall and includes a lower end intercommunicating with the compartment and an upper end connected to the first end of the first guiding tube.

4. The cold brew coffee extraction device as claimed in claim 3, further comprising a washer mounted between the first annular wall and the second annular wall.

5. The cold brew coffee extraction device as claimed in claim 2, wherein the filtering cup includes a second bottom wall and a second annular wall extending upward from the second bottom wall, wherein the second annular wall sealingly abuts the first annular wall of the container, wherein a compartment is provided between the first bottom wall and the second bottom wall, wherein a sleeve extends upward from the second bottom wall and includes a lower end intercommunicating with the compartment, wherein an inner tube extends upward from the first bottom wall and includes an upper end received in the sleeve and a lower end connected to the first guiding tube, and wherein a through-hole is provided in the upper end of the inner tube to intercommunicate the inner tube with the compartment.

6. The cold brew coffee extraction device as claimed in claim 5, further comprising a washer mounted between the first annular wall and the second annular wall.

7. The cold brew coffee extraction device as claimed in claim 1, wherein a second cover is provided to seal the second opening, wherein the first guiding tube extends through the container and the second cover, wherein the filtering cup includes a second bottom wall and a second annular wall extending upward from the second bottom wall, wherein the second opening is located in an upper end of the second annular wall, wherein the second bottom wall and the second annular wall define the second chamber, and wherein the third opening is located in a lower portion of the second annular wall.

8. The cold brew coffee extraction device as claimed in claim 7, wherein the controller includes a water level detection device, wherein the water level detection device detects the water level of the cold water in the first chamber and controls the pump to supply air into or suck air out of the first guiding tube.

9. The cold brew coffee extraction device as claimed in claim 1, wherein the extraction operation device further includes a second guiding tube extending through the container, wherein the second guiding tube includes a first end located in an upper portion of the first chamber and a second end connected to the pump, and wherein the second pump is configured to supply air into the first and second guiding tubes or to suck air out of the first and second guiding tubes.

* * * * *